United States Statutory Invention Registration [19]

[11] Reg. Number: H384

Dillinger et al. [43] Published: Dec. 1, 1987

[54] STOWABLE THREE-AXIS REACTION-STEERING SYSTEM

[75] Inventors: Robert B. Dillinger; Arnold O. Danielson, both of Ridgecrest, Calif.

[73] Assignee: The United States of America as represented by the Secretary of the Navy, Washington, D.C.

[21] Appl. No.: 55,810

[22] Filed: May 28, 1987

[51] Int. Cl.[4] ..... F02K 1/00

[52] U.S. Cl. ..... 60/230; 60/251

[56] References Cited

U.S. PATENT DOCUMENTS

| | | | |
|---|---|---|---|
| 3,279,183 | 10/1960 | Horgan et al. | 60/230 |
| 3,296,799 | 1/1967 | Fuentes | 60/231 |
| 3,300,978 | 1/1967 | Pennington | 60/231 |
| 3,646,762 | 3/1972 | Hawk et al. | 60/204 |
| 3,743,184 | 4/1973 | Mancus | 239/265.19 |
| 4,018,384 | 4/1977 | Fitzgerald et al. | 239/265.19 |
| 4,131,246 | 12/1978 | Rotmans | 244/3.22 |
| 4,272,040 | 6/1981 | Bastian et al. | 244/3.22 |
| 4,274,610 | 6/1981 | Bastian | 244/3.22 |
| 4,364,530 | 12/1982 | Ripley-Lotee et al. | 244/3.22 |

*Primary Examiner*—Harold J. Tudor

*Attorney, Agent, or Firm*—William C. Townsend; W. Thom Skeer

[57] ABSTRACT

A thrust vector control apparatus for selective deployment of a vane within an exhaust stream has the vane mounted on the periphery of an exhaust nozzle for pivotable movement between a retracted position without the stream and an inserted position within the stream. A pivotally mounted link assembly is used with an actuator to urge the vane into the stream. The link assembly becomes locked in place upon the full insertion of the vane. This locked position precludes unintended pivotal motion of the vane; however, rotational motion of the vane is still possible due to the pivotal connection of the link. A second actuator rotates the vane in the stream, thereby controlling the direction of the stream.

4 Claims, 7 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

Fig. 1
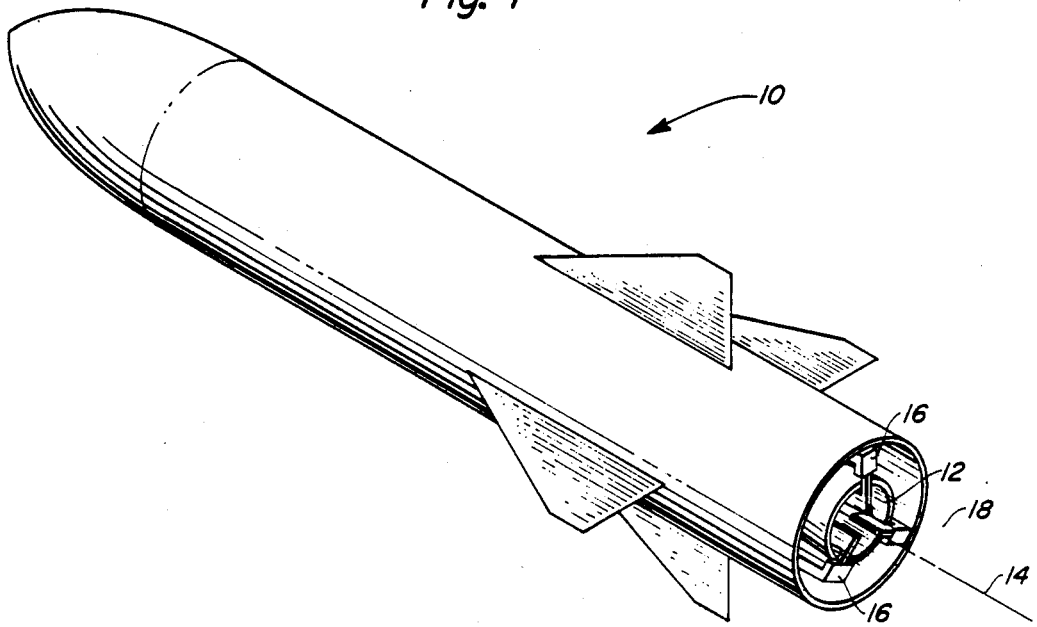
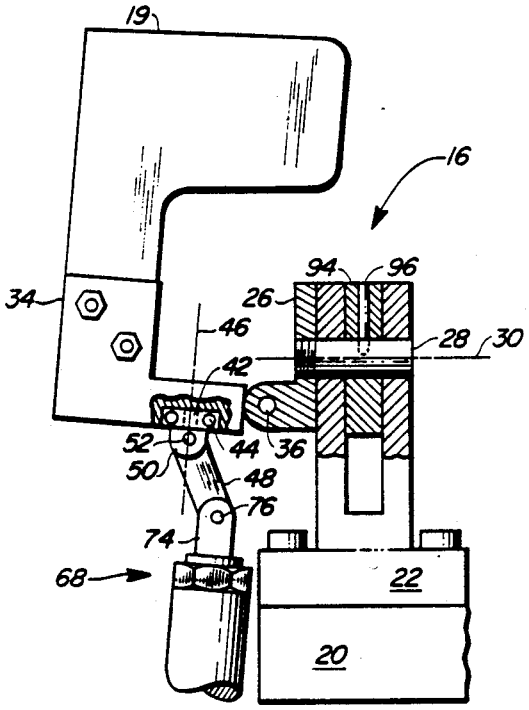
Fig. 3A
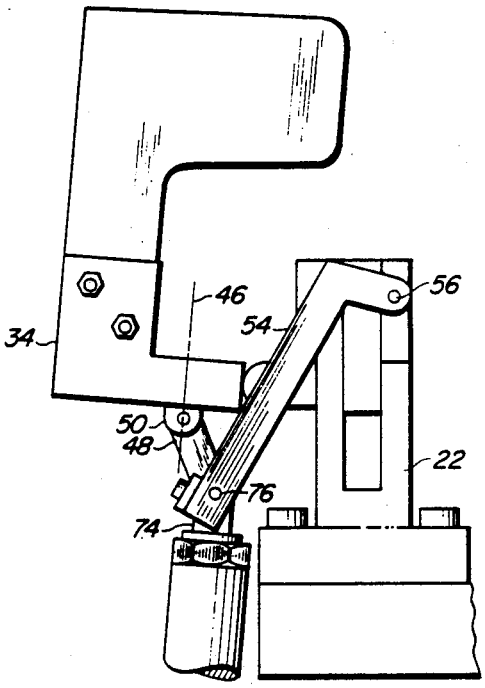
Fig. 3B

STOWABLE THREE-AXIS REACTION-STEERING SYSTEM

BACKGROUND OF THE INVENTION

1. Field of the Invention

The invention pertains generally to the field of aerial missiles. In greater particularity, the invention pertains to a system that enhances the steering capability of a guided missile. By way of further characterization, the invention relates to a stowable, vane thrust vector control device that when used in groups of three or more, provides yaw, pitch and/or roll control for a guided missile.

2. Description of the Prior Art

Thrust vector control systems are well known in the prior art. Their purpose is to enhance missile steering capability. Thrust vector control is particularly valuable during missile launch phase when rapid maneuvering is often desirable to avoid scannable airspace, during high altitude cruising when low atmospheric density makes traditional airfoil steering techniques inadequate, and during radical target-intercept maneuvers when employment of traditional airfoil control would rapidly degrade missile flying energy. A number of thrust vector control devices have been developed including: rotatable nozzles, multiple nozzles, gas injection, jet tabs and jet vanes. The jet vane thrust vector control systems of the prior art have incorporated either non-retractable vanes or retractable vanes reciprocable from walls of the rocket nozzle.

Both of these approaches have shortcomings. During periods of non-use, non-retractable vanes create unwanted thrust interference. Further, non-retractable vanes experience rapid erosion due to constant exposure to the exhaust stream. Retractable vanes reciprocated from the nozzle's interior surface can jam upon retraction due to slag build-up on the vane. In addition, withdrawal of an eroded reciprocating vane can leave a void in the inner surface of the nozzle. This void causes erosion thereat resulting in damage to the nozzle.

SUMMARY OF THE INVENTION

The thrust vector control apparatus of the invention, when used in groups of three or more, provides selective three-axis steering control for a rocket-engined missile. The apparatus includes a rotatable vane that is pivotable into and out of an exhaust stream from a multi-axised mount positioned on the periphery of the discharging nozzle. This multi-axised mount includes a hinge plate having rotatable movement about an axis perpendicular to the longitudinal axis of the nozzle and includes a vane mount attached to the hinge plate and having rotational movement as well as pivotable movement about an axis generally transverse to the hinge plate axis. The resulting configuration permits optional thrust vector control by allowing an attached vane to be pivoted into the exhaust stream and then rotated therein, thereby controllably directing the stream. Linkage is connected directly to the vane mount, and indirectly to the vane, to provide the pivotable and rotational movement of the vane. Lock and guide means direct the linkage and, when the vane is in the inserted position, lock the linkage in place, thereby precluding the impinging thrust from removing the vane from the exhaust stream. One linear reciprocating actuator drives this linkage and another such actuator drives the hinge plate by way of a crank. These actuators serve, respectively, to urge the vane into and out of the exhaust stream, and to rotate the vane within the stream.

OBJECTS OF THE INVENTION

It is accordingly an object of this invention to provide an improved thrust vector control system for a missile.

A further object of this invention is to provide a thrust vector control system that is capable of being selectively deployed.

A still further object of this invention is to provide a vane thrust vector control system that provides yaw, pitch and/or roll control of a missile.

BRIEF DESCRIPTION OF THE DRAWINGS

These and other objects will become more apparent when the following specification and claims are construed together with the drawings in which:

FIG. 1 is a perspective view of a missile, having the thrust vector control apparatus of the invention;

FIG. 3*a* is a partially cross-sectioned view of the apparatus of FIG. 2;

FIG. 3*b* is a side view of the apparatus taken from the same position as FIG. 3*a*;

DESCRIPTION OF THE PREFERRED EMBODIMENT

Figure 2:
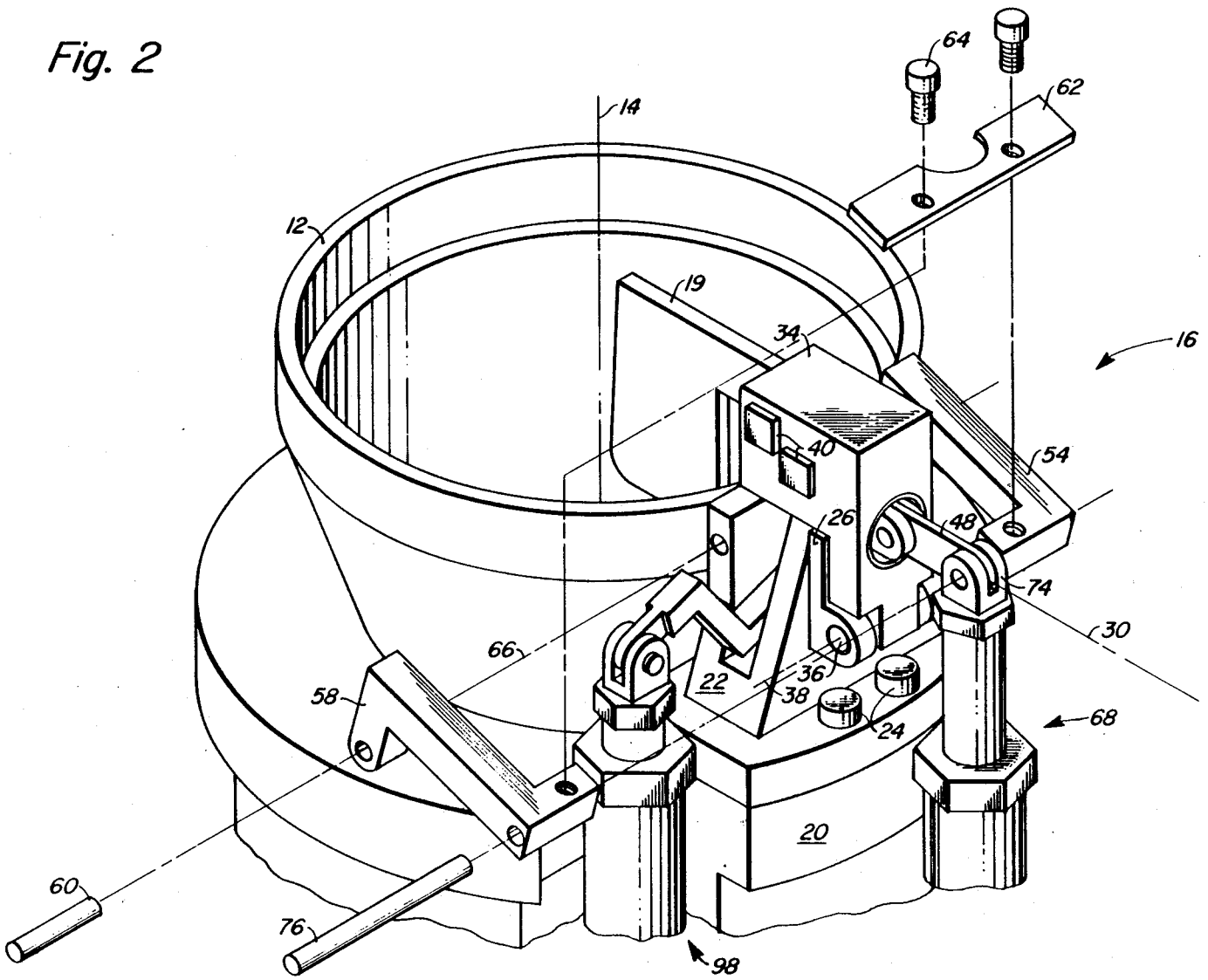
FIG. 2 is an isometric view of the apparatus of FIG. 1 positioned at a representative exhaust nozzle.

Referring to FIG. 1, there is illustrated a representative missile 10 having at its aft end an exhaust nozzle 12 with a longitudinal axis 14. Thrust vector control (TVC) apparatus 16 of the present invention is shown positioned at nozzle 12 and partly within the exhaust stream 18.

FIG. 2 shows a vane 19 mounted on nozzle 12 for pivotable and rotational movement. Vane 19 has the shape of an aerodynamic foil, and is commonly made from a refractory material such as ceramic-coated steel, copper-infiltrated tungsten or a carbon-carbon combination. A flange 20 is mounted to nozzle 12 to serve as a base for apparatus 16, shown in FIG. 2 with vane 19 in an inserted position.

By referring to both FIGS. 2 and 3*a*, it can be seen that a clevis block 22 is attached to flange 20 by conventional fasteners 24. A hinge plate 26 is affixed to a spindle 28 which is journaled for rotation within clevis block 22 about a first or rotational axis 30 that is generally perpendicular to longitudinal axis 14. A vane mount 34 is attached to hinge plate 26 by a hinge pin 36. Hinge pin 36 allows vane mount 34 to pivot about a second axis 38 which is shown also in FIG. 4 and is generally transverse to first axis 30. Vane 19 is secured to mount 34 by fasteners 40. This mounting arrangement allows vane 19 to be pivoted about second axis 38 between a retracted position, without exhaust stream 18, and an inserted position, within exhaust stream 18 where vane 19 may have rotational movement about first axis 30.

Figure 3C:
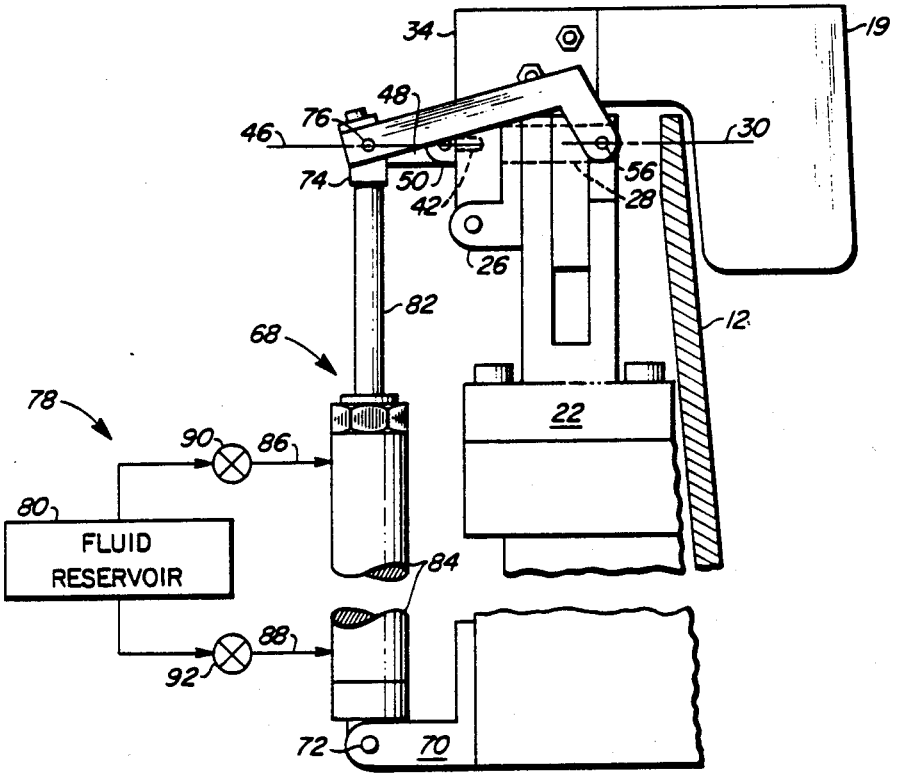
FIG. 3*c* is a side view of the apparatus taken from the position of FIGS. 3*a* and 3*b*, showing the apparatus with a fragmentary exhaust nozzle.
Figure 4:
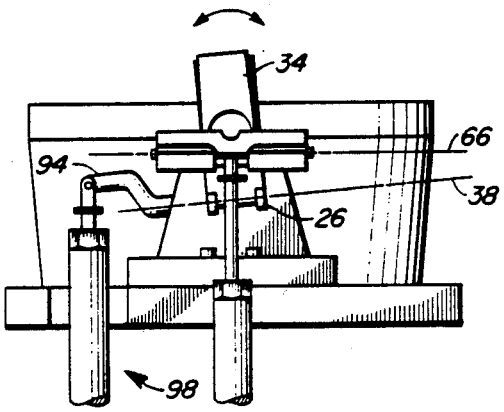
FIG. 4 is a side view of the apparatus taken from a position at a right angle to that of FIGS. 3*a*, 3*b*, and 3*c*.

In FIGS. 2, 3*a*, and 4, particularly FIG. 3*a*, there are shown elements for pivoting vane 19 about second axis 38 which is shown in FIGS. 2 and 4. These elements include a member 42 journaled for rotation within vane mount 34 by a conventional thrust bearing 44. Member 42 is rotatable about a third axis 46 generally transverse to second axis 38. A link 48 is pivotally attached at one end to member 42 by a clevis 50, which is attached to member 42, and a pin 52.

Reference is now made to FIGS. 2, 3*b* and 3*c*, with particular reference to FIGS. 3*b* and 3*c* which show TVC apparatus 16 in retracted and inserted positions, respectively. Elements for pivoting vane 19 between these two positions further include a lock and guide device, to be described henceforth in detail. Apparatus 16 has a first arm 54 pivotally connected to clevis block 22 by a pin 56. A second arm 58, which is shown in FIG. 2 in exploded view, is positioned opposite first arm 54 and is pivotally mounted to clevis block 22 by a pin 60. A support plate 62 is fastened to arms 54 and 58 by conventional fasteners 64, and serves to structurally join the arms for unitary movement. Arms 54 and 58, and the support plate 62 rotate as one on pins 56 and 60 about a fourth axis 66, shown in FIGS. 2 and 4.

Referring to FIGS. 2 and 3*c*, particularly FIG. 3*c*, it is seen that elements for pivoting vane 19 also include an extendable and contractable hydraulic push-push linear actuator 68. Actuator 68 is pivotally connected at one end to flange 20 by a clevis 70 and a pin 72. Actuator 68 has a clevis 74 attached to its opposite end. A pin 76, best shown in FIG. 2, is extended through arms 54 and 58 to interconnect arms 54 and 58 with the second end of link 48 and with a clevis 74 of actuator 68.

As is shown in FIG. 3*c*, actuator 68 has a control 78 which includes a fluid reservoir 80 containing hydraulic fluid under pressure. Actuator 68 has a rod 82 and a body 84. Body 84 is connected to the reservoir 80 by conduits 86 and 88. Conventional servovalves 90 and 92 control the flow of the hydraulic fluid to and from actuator 68.

Referring now to FIGS. 3*b* and 3*c*, pivotable movement of vane 19 begins upon control 78 causing extension or contraction of actuator 68. Extension of actuator 68 causes pin 76, which is attached to the second end of link 48, to follow an arcuate path about the fourth axis 66, shown best in FIG. 2. Arms 54 and 58 guide pin 76 along this path. Simultaneously, vane 19 and vane mount 43 pivot about second axis 38, shown best in FIG. 2. Vane 19 becomes fully inseerted within stream 18 upon the general alignment of the third axis 46 and first axis 30 and upon the coaxial alignment of spindle 28 with member 42 as shown in FIG. 3*c*. At this point, the extension of actuator 68 ceases due to the actuator control 78 or the preadjusted reach of the actuator. Also at this point, the rotating action of arms 54 and 58 will have ushered link 48 into a locked position characterized by link 48 being wedgd between pin 76, which is connected to arms 54 and 58, and pin 52, which is connected to member 42 as shown in FIG. 3*c*. This locked position precludes vane 19 from being unintentionally withdrawn from exhaust stream 18. Arms 54 and 58 effectively serve to direct the force of the thrust acting upon vane 19 away from actuator 68 and to clevis block 22. This redirection of force prevents the failure of actuator 68 from crippling the operation of the invention and makes unnecessary constant actuator operation. Contraction of actuator 68 disengages link 48 from the locked position, and retracts vane 19 from stream 18, as shown in FIG. 3*b*.

Figure 5:
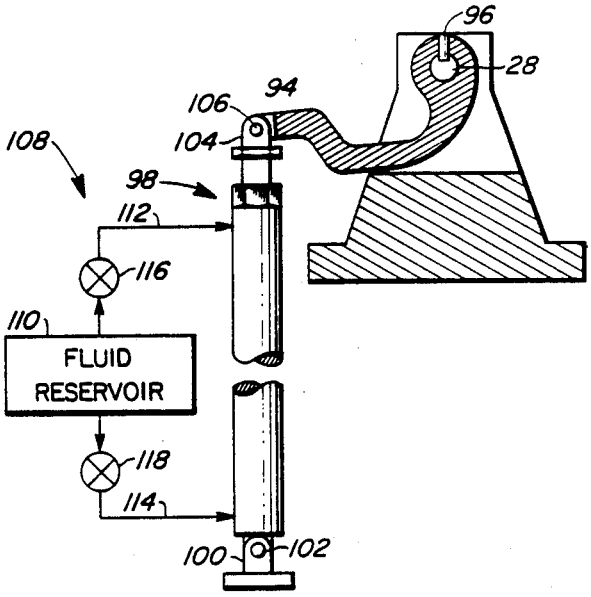
FIG. 5 is a partial cross-section of the apparatus taken from the position of FIG. 4.

Referring now to FIGS. 3*a* and 5, particularly FIG. 3*a*, it is seen that elements for rotating vane 19 include a crank arm 94 affixed at one end to spindle 28 by a pin 96. Elements for rotating vane 19 also include an extendable and contractable hydraulic push-push linear actuator 98. Actuator 98 is pivotally connected at one end thereof to flange 20 by a clevis 100 and a pin 102. At its opposite end, actuator 98 has a clevis 104 that is connected pivotally to a second end of crank 94 by a pin 106. Apparatus 16 has a control 108 for actuator 98 that mirrors control 78 for actuator 68 in that control 108 includes a fluid reservoir 110, conduits 112 and 114, and servovalves 116 and 118. Operation of actuator 98 is thus like that of actuator 68.

Referring to FIGS. 2, 3*c*, and 5, with particular reference to FIG. 2, it can be seen that rotatable movement of vane 19 begins upon the vane being fully inserted within exhaust stream 18. Extension or contraction of actuator 98 causes hinge plate 26 to rotate with spindle 28 about first axis 30. Concurrently, the interconnected vane mount 34 and vane 19 are caused to rotate about this same axis. As is shown in FIG. 3*c*, the insertion of vane 19 within exhaust stream 18 causes first axis 30 of spindle 28 to become generally coaxial with third axis 46 of member 42. This alignment allows vane mount 34 to rotate about the stationary member 42 of the vane pivoting means. Thus, the linkage used for pivoting vane 19 into stream 18 does not interfere with the rotation of vane 19.

By utilizing three or more of the TVC apparatuses of the invention about the periphery of a rocket exhaust nozzle, three-axis steering control is achieved. However, more limited thrust vector control may be achieved by utilizing a lesser number of the apparatuses. Coordinated movement of the apparatuses could, in either case, be achieved by a central command center on board the missile. Furthermore, the effects of heavy thrust exposure to the mounting structure of the vane may be minimized by adding heat shielding to the apparatus.

Obviously, those skilled in the art will realize that these and other modifications and variations of the invention are possible in light of the above teachings. Therefore, it is to be understood that within the scope of the following claims, the invention may be practiced otherwise than has been specifically described.

What is claimed is:

1. A thrust vector control apparatus for a rocket motor having an exhaust nozzle discharging an exhaust stream, said exhaust nozzle having a longitudinal axis, the apparatus comprising:

a vane;

means for mounting said vane on said exhaust nozzle for pivotal movement between a retracted position without said exhaust stream and an inserted position within said exhaust stream and for rotational movement about a rotational axis generally perpendicular to said longitudinal axis;

means for pivoting said vane between said retracted position and said inserted position; and means for rotating said vane about said rotational axis.

2. A thrust vector control apparatus for a rocket motor having an exhaust nozzle discharging an exhaust stream, said exhaust nozzle having a longitudinal axis, the apparatus comprising:

a hinge plate connected to said exhaust nozzle for rotational movement about a first axis generally perpendicular to said longitudinal axis;

a vane mount connected to said hinge plate for rotational movement therewith and for pivotal movement about a second axis generally transverse to said first axis;

a vane attached to said vane mount for pivotal movement therewith about said second axis between a retracted position without said exhaust stream and an inserted position within said exhaust stream where said vane is rotationally moveable about said first axis;

means for pivoting said vane about said second axis; and means for rotating said vane about said first axis.

3. The apparatus of claim 2, wherein said means for pivoting said vane comprises:

a member attached to said vane mount for rotatable movement about a third axis generally transverse to said second axis;

a link having opposite ends and pivotally attached at one end thereof to said member;

lock and guide means, pivotally connected to a second end of said link and connected to said exhaust nozzle for rotation about a fourth axis generally transverse to said longitudinal axis, for locking said link into a locked position characterized by said link being wedged between said member and said lock and guide means so that pivotal movement of said vane is precluded, and for guiding said link between said locked position in wedged engagement with said member and said lock and guide means and an unlocked position out of wedged engagement with said member and said lock and guide means;

extendible and contractible linear actuator means pivotally connected to said second end of said link and connected to said exhaust nozzle; and control means for selectively extending and contracting said actuator means, said control means interacting with said actuator means, lock and guide means, link and member to pivot said vane between said retracted and said inserted positions.

4. The apparatus of claim 2, wherein the means for rotating said vane comprises:

a crank arm attached at one end to said hinge plate;

extendible and contractible linear actuator means pivotally connected to a second end of said crank and connected to said exhaust nozzle; and means for selectively extending and contracting said actuator means.

* * * * *